United States Patent
Haab et al.

(10) Patent No.: US 7,379,717 B1
(45) Date of Patent: May 27, 2008

(54) ADJUSTABLE AMPLIFIER FOR WIRELESS DATA SYSTEMS

(75) Inventors: Daniel B. Haab, Springville, UT (US); Vaughn R. Staheli, Payson, UT (US); Jeffery L. Roberts, Clearfield, UT (US); Rob Rohde, Kaysville, UT (US)

(73) Assignee: Luxul, Inc., Linden, UT (US)

( * ) Notice: Subject to any disclaimer, the term of this patent is extended or adjusted under 35 U.S.C. 154(b) by 583 days.

(21) Appl. No.: 11/005,349

(22) Filed: Dec. 6, 2004

Related U.S. Application Data

(60) Provisional application No. 60/481,754, filed on Dec. 8, 2003.

(51) Int. Cl.
*H04B 1/04* (2006.01)

(52) U.S. Cl. .............. 455/127.1; 455/126; 455/343.1

(58) Field of Classification Search ............... 455/127, 455/126, 343.1; 343/890
See application file for complete search history.

(56) References Cited

U.S. PATENT DOCUMENTS 6,222,503 B1 * 4/2001 Gietema et al. ............ 343/890
6,463,264 B1 * 10/2002 Obara ..................... 455/127.2

* cited by examiner

*Primary Examiner*—Sanh D. Phu
(74) *Attorney, Agent, or Firm*—Colter Jennings

(57) ABSTRACT

A flexible amplification system for wireless data networks is disclosed. The amplification system may be powered from multiple sources including power over Ethernet, obviating the need for independent data and power cables. The amplification system may be digitally controlled to optimize bi-directional transmit and receive capabilities and to produce a constant output.

20 Claims, 3 Drawing Sheets

ADJUSTABLE AMPLIFIER FOR WIRELESS DATA SYSTEMS

RELATED APPLICATION DATA

This application claims priority from U.S. Provisional Patent Application Ser. No. 60/481,754 filed Dec. 8, 2003 titled "Wireless Radio Broadband Data Communication, Multiple Power Input, Bi-Directional Signal Amplifier," which provisional application is hereby incorporated by reference in its entirety.

BACKGROUND

This invention relates generally to radio signal amplification for broadband wireless data communication and specifically to powering such devices. Typical wireless network systems comprise one or more access devices for communication purposes. Users communicate with each other and access data with wireless communication devices including desktop and portable computers, personal digital assistants, cellular telephones and other wireless devices.

Wireless data communications generally follow one or more of the standards promulgated by industry organizations, such as the Institute of Electrical and Electronic Engineers (IEEE) standards 802.11a, 802.11b, and 802.11g. These standards and Federal Communications Commission (FCC) regulations that govern the frequency bands that such standards use, restrict the power of radio signals that carry the data, thus limiting the physical area over which signals can be reliably transmitted and received. For large buildings, and particularly office buildings having steel-beam construction that may inhibit radio wave propagation, wireless data systems often require multiple transmitters or "access points" and amplifiers to ensure usable signal strength in the desired coverage area. To maintain optimum coverage, the access points or amplifiers must be controlled to provide a constant output.

The placement of such multiple access points and amplifiers has typically required multiple cables to carry both the data signal and the required power to the transmitting device. This complicates the already difficult task of retrofitting wireless systems in completed structures. For instance, the requirement to provide an electrical power supply to the access point or amplifier may be complicated by the lack of standard power outlets in the required areas and the building code requirements that are invoked if new power wiring must be installed.

The present invention mitigates these complexities by providing multiple sources of power for access points and amplifiers via existing Ethernet cables or radio antenna cables by use of a power injection devices, or alternatively, by direct connection of the appropriate DC voltage. A method is also provided to enhance the control of constant output amplifiers to maximize signal strength and coverage as well as minimizing installation complexity.

SUMMARY

According to the present invention, a device is provided that satisfies the need to provide alternative power sources to wireless data access points and amplifiers that provide bi-directional signal transfer in wireless networks. The device permits the flexible operation of a wireless network by allowing more freedom in placement of access points and amplifiers through multiple sources of electrical power, including (1) power over Ethernet; (2) power over radio frequency (RF) coaxial cabling; or (3) direct power input. The coverage of the access points is also enhanced and stabilized by controlling the RF amplification stage to provide a constant output consistent with FCC regulations and to automatically adjust for coaxial cabling losses between the access point and the amplifier.

One key benefit of providing multiple power input options is the ready availability of standard network connections on wired network devices. This standard typically uses RJ45 Category 5 (Cat 5) cable to connect devices using standard Ethernet input and output configurations and standard RJ45 connectors. Because a wireless data access point receives and transmits data via a wired connection to a server or other device, the Cat 5 cable connection is a pre-requisite to operation of most systems. Power can be supplied to the access point or amplifier through paired wires in the Cat 5 cable that are not used for the transmission of data signals in accordance with IEEE 802.3af, which applies to power over Ethernet.

Pairs 4 and 5 or 7 and 8 may be used for this purpose, acting as electrical conduits for a direct current power supply to the access point or amplifier. The Cat 5 cable specifications are sufficient to carry an appropriate voltage and sufficient current to operate typical access points and amplifiers. The power requirements of such devices are relatively small, typically 13 watts or less, based on the typical electrical efficiency of such amplifiers, as is known in the art, and the output restrictions imposed by FCC regulations and standards set by the IEEE.

Power is introduced by a DC power injector preset to provide the correct voltage required based on the design specifics and tolerances of the access point or amplifier. The device accepts power directly from a 12 volt to 48 volt direct current source. The IEEE 802.3af standard specifies a 44-57 volt system.

The provision of power via the data cable obviates the need for an independent power supply which might otherwise require additional wiring to provide standard line current, which might require building code compliance, inspections, changes to existing power lines or conduits, and down time for other systems while building power is modified. If direct DC power is used, power over Ethernet avoids the need to provide transformers, rectifiers, and low voltage wiring that would parallel the existing data cable.

The access point or amplifier accepting power over the Ethernet connector also provides internal circuitry or firmware that facilitates tuning the output for specific applications, such as geographical coverage. The control system also ensures that the system can be tuned to ensure compliance with FCC emission standards. The control system uses internal firmware algorithms to provide an output that will remain fixed regardless of fluctuations in the signal strength of the radio frequency input to the amplifier or in the power supply voltage.

The invention provides for attenuation of the transmit signal generated by the access point (radio) to maintain a constant output level to the antenna. The device has one or more traffic indicator lights that can display when a radio frequency signal is present and transmitting or receiving data through the device. This eliminates the need to customize the amplifier for each setup by automatically determining the input power and attenuating that input so that a constant gain amplification circuit maintains a constant predetermined output level in accordance with the installation requirements.

BRIEF DESCRIPTION OF THE DRAWINGS

Other features and advantages of the present invention will be apparent from the following Detailed Description taken in conjunction with the accompanying Drawings, in which.

DETAILED DESCRIPTION

According to the present invention, an apparatus is provided that facilitates the attachment of alternative power sources to wireless data access points and amplifiers to provide bi-directional signal transfer in wireless networks. The apparatus permits the flexible operation of a wireless network by allowing more freedom in placement of remote access points and amplifiers through multiple sources of electrical power, including (1) power over Ethernet; (2) power over RF coaxial cabling; or (3) direct power input. The ability to piggy-back direct current power over an existing Ethernet cable facilitates the optimum placement of remote access points and amplifiers and simplifies the installation requirements, thus providing significant advantages and cost savings.

The advantages of optimized placement of a single or multiple access points or amplifiers are further enhanced by incorporating control circuitry into the amplifier or amplification stage of an access point that stabilizes the RF output at a constant level to comply with FCC regulations and specific system requirements and by providing a controlled input to the RF amplification stage for enhanced reliability and ease of use. This allows the device to be connected to any radio that falls within the operational parameters of the device to be connected without any additional effort. The apparatus of the present invention is radio independent and does not require user intervention to achieve the desired output level.

Figure 1:
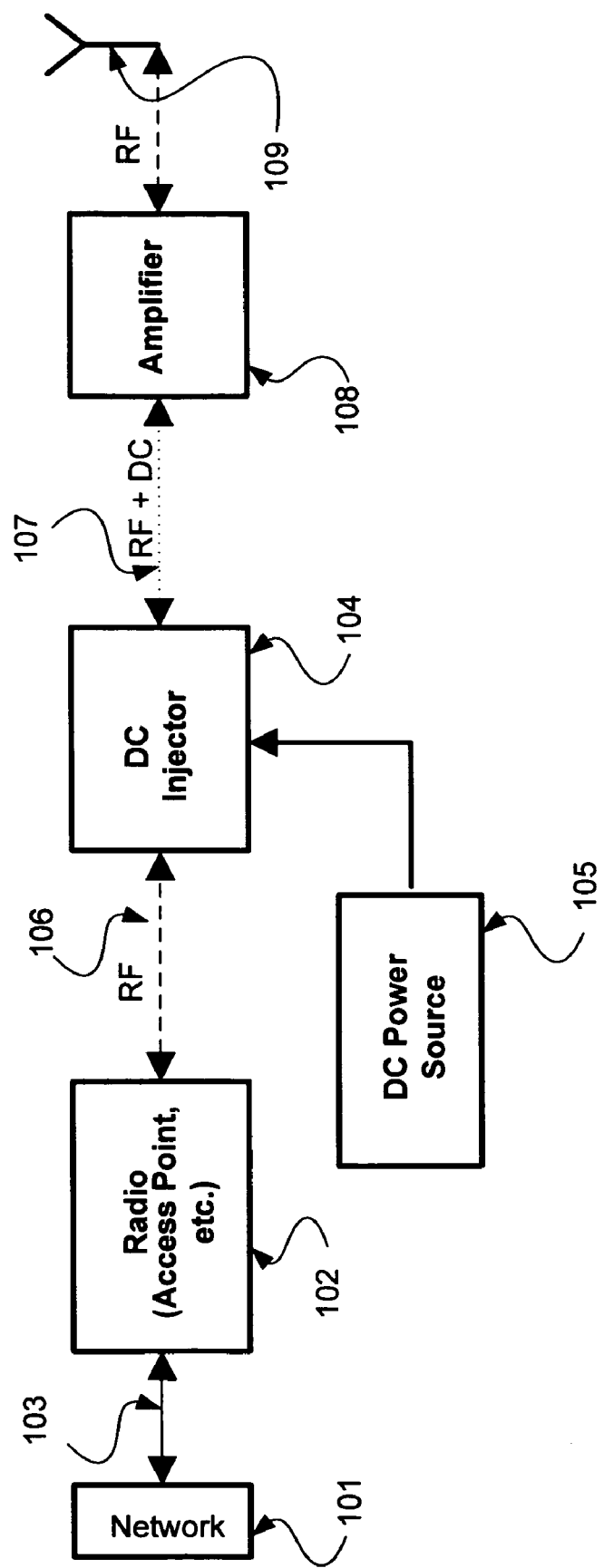
FIG. 1 is a block diagram of a typical prior method for powering a remote amplifier.

FIG. 1 depicts a prior apparatus for powering a remote amplifier. A computer data network 101 is connected to a wireless network device 102 such as an access point or radio operating on an appropriate frequency as provided by standards such as IEEE 802.11a, 802.11b, or 802.11g, all of which operate on different bandwidths and, thus, have different data transmission rates. The connection between the network and the wireless network device may be via a standard Cat 5 cabling system 103 using RJ45 standard Category 5 input and Category 5 output connectors, or through a Universal Serial Bus (USB) cable, or through other means as is known in the art.

To expand the geographical coverage of the wireless transmission device or to extend it to a remote site, the RF signal from the wireless transmission device is connected to a DC injector 104 over RF compliant coaxial cable 106 appropriate for the radio frequency being utilized, or other non-coaxial RF transmission medium appropriate for such frequency band as is known in the art. The DC power injector receives power from a DC power source 105 that is combined with the RF signal to form a combined RF+DC signal over coaxial or other appropriate RF transmission line 107 to the remote RF amplifier 108. The RF amplifier 108 separates the DC and RF components, routing the DC component to the amplifier's power system and the RF component to the amplifier's input. The amplified RF signal is routed to one or more antennas 109 for broadcast and reception of signals from wireless data devices, such as desktop and laptop computers, personal digital assistants (PDAs), and other devices with transmit and receive capabilities compliant with the standard of the originating access point.

RF loss through coaxial cabling is generally inversely proportional to the cable size. Larger cables are required to reduce loss and allow longer cabling paths with acceptable signal loss, particularly in receive mode in which signal loss through the cable can make the difference between being able to decode the signal or not. Low loss cable is expensive and large, and so it is difficult to handle and to install.

Figure 2:
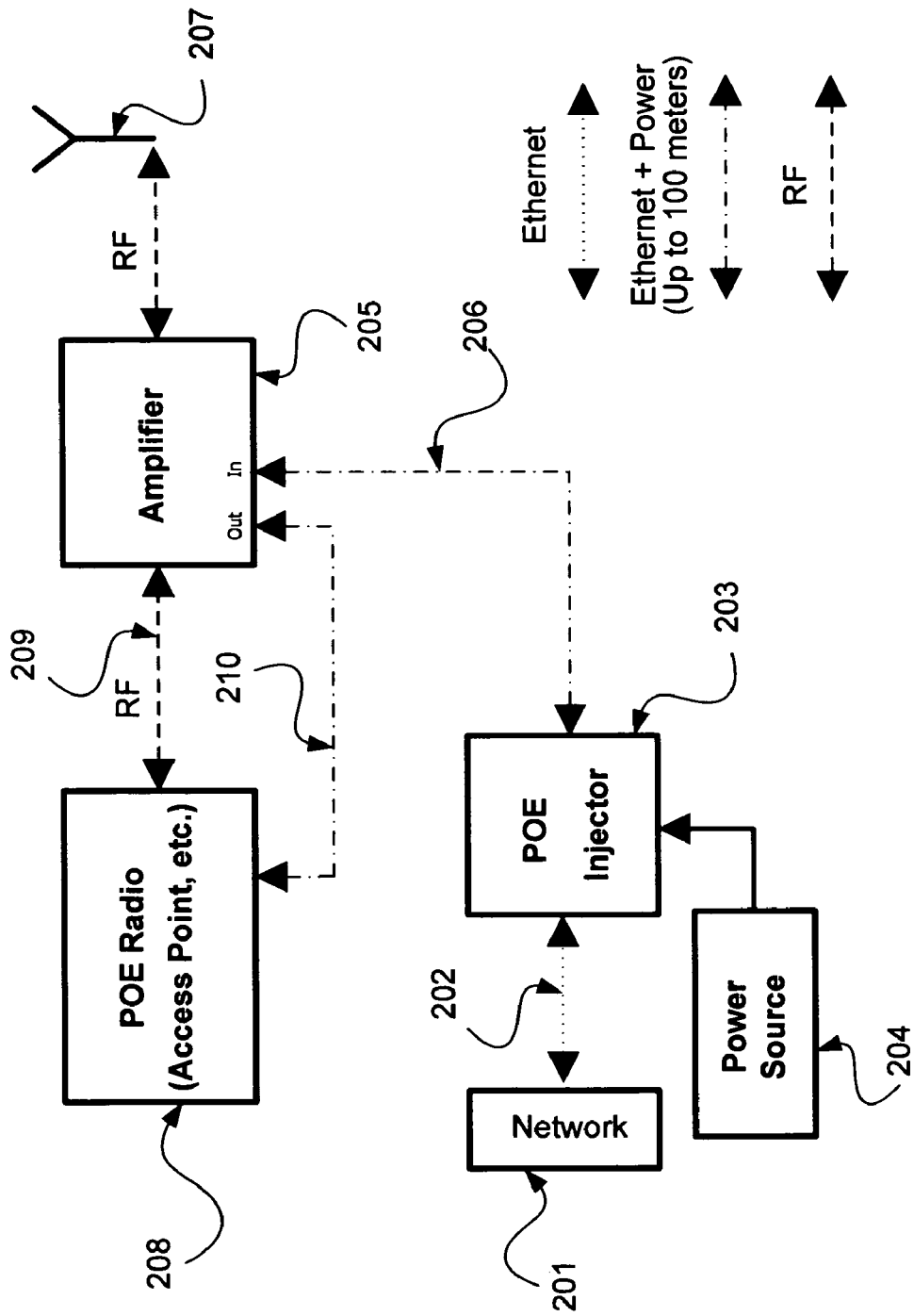
FIG. 2 is a block diagram of an apparatus for powering a remote amplifier and radio using power over Ethernet according to one embodiment of the present invention.

FIG. 2 depicts, in block diagram, an apparatus for powering a remote access point (radio) or amplifier by power over Ethernet (POE) according to one embodiment of the invention. A computer data network 201 is connected by standard Cat 5 Ethernet cable 202 to a power-over-Ethernet power injection device 203. This cable carries only the bi-directional data stream that will be transmitted and received over a wireless data network. The power injector 203 is connected to a power source 204 that delivers the appropriate voltage and sufficient current capability to power the remote RF amplifier 205 and POE radio 206. The power source 204 may be a DC or an AC source, though presently a DC source is preferred.

The power injector 203 is connected to an RF amplifier 205 by a cable 206, which may be standard Cat 5 Ethernet cabling using standard RJ45 connectors. This cable 206 carries the data signal and the power injected by the power injector 203, with the power being coupled to one pair of unused wires in the Cat 5 cable. Pairs 4 and 5 or 7 and 8 are generally used for this purpose.

Unlike the system described above where power is coupled with the RF signal, the amplifier does not need to filter the DC component from the RF component. The appropriate voltage is routed to the amplifier over the selected wire pair, which may be directly coupled to the power system of the amplifier. The wire pair or pairs carrying the data component are coupled within a POE radio 208 (or "access point") that includes appropriate circuitry to produce and modulate the RF signal with data in accordance with the desired IEEE standard or other method as is known in the art, transmitting the amplified RF signal to one or more antennas 207 via a standard RF transmission medium such as coaxial cable.

One key advantage of the present invention is the ability to add additional remote amplifiers and access points without the need to install additional power systems, power injectors or other power-related devices. As shown in FIG. 2, the amplifier 205, which may be an additional amplifier or other RF transmission or receiving device, is coupled by an additional RF transmission line 209 and an additional Ethernet cable 210 with RJ45 connectors to an RF signal source, such as the access point (radio) 208. In this configuration, the data is carried by the RF signal, having been modulated by the access point 208, and the Ethernet cable carries the power component and the data component. Multiple additional access points (radios), amplifiers, or other RF devices may be connected either in series or in parallel to provide the configuration required to meet any requirements for access by wireless device users. The access point could also receive and modulate data from a network bridge, router, or other device as known in the art.

Figure 3:
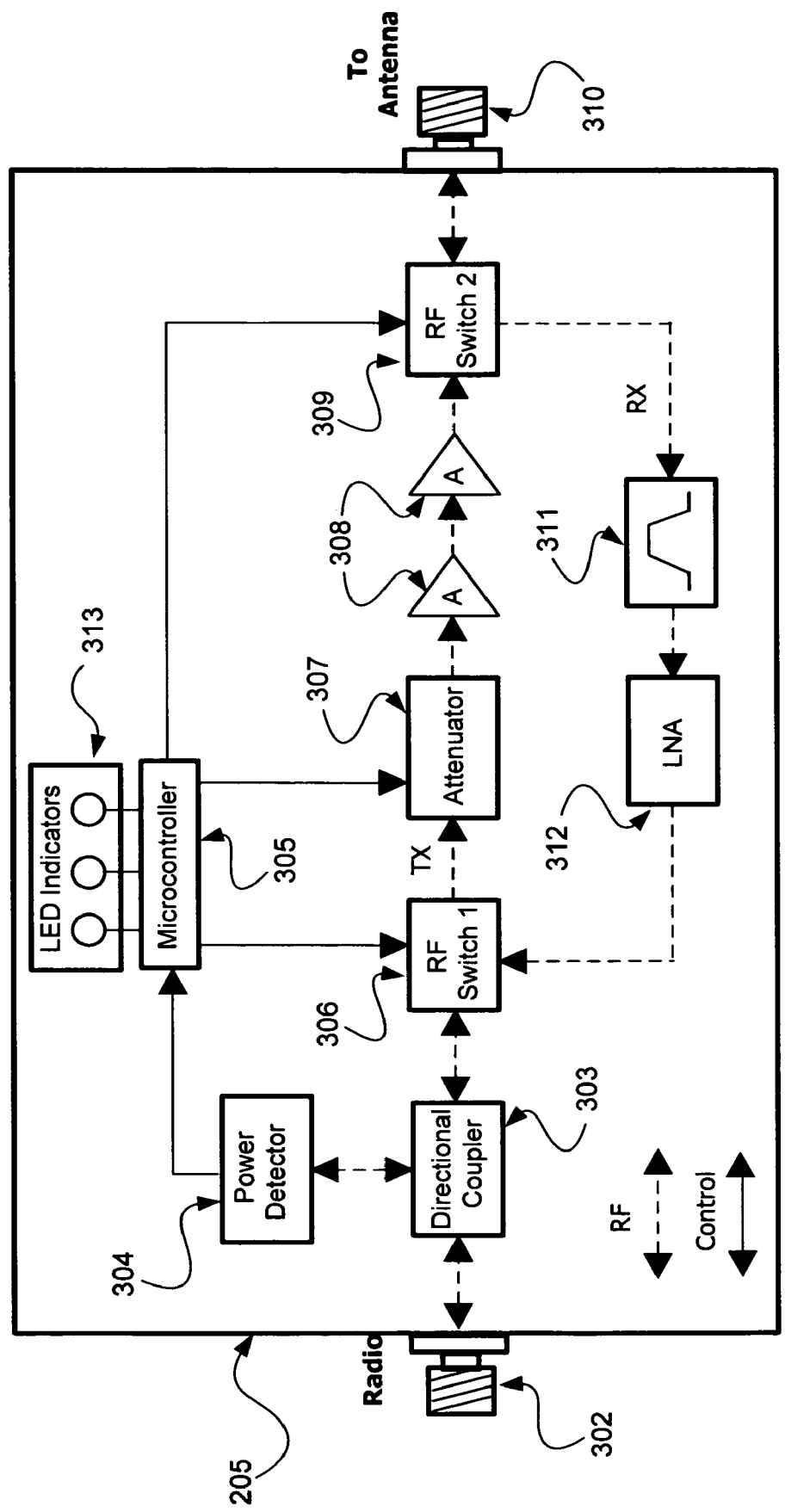
FIG. 3 is a block diagram of an apparatus for implementing a digitally controlled constant output amplifier according to one embodiment of the present invention.

FIG. 3 depicts one method of implementing a digitally controlled constant output amplifier 205 to optimize the coverage of a wireless data transmission system as described above. An RF signal modulated to carry the data component for a wireless network and compliant with the appropriate IEEE or other data transmission standard is connected to the amplifier 205 through a standard RF coupling device 302 for bi-directional communication of both input and output. The input/output connects to a directional coupler 303 that samples a small amount of the input (TX) flow of the RF signal in the amplifier 205.

A power detector 304 connected to the directional coupler 303 detects the presence of an input (TX) RF signal. The power detector 304 is coupled to a microcontroller 305 that samples the output of the power detector and then controls the switching within the amplifier to appropriately route signals in transmit and receive mode based on the detection of an RF signal at the input (TX). An RF signal at the input places the amplifier in transmit mode, whereas the absence of such signal leaves the amplifier in receive mode.

The microcontroller 305 controls the bi-directional signal flow through coupling to a first RF switch 306 that routes the RF signal to an RF attenuator 307 while in transmit mode. The RF attenuator 307 adjusts the signal strength by decreasing it to the appropriate input level and then feeds the attenuated signal to one or more RF amplification stages 308. The level of attenuation is controlled by a firmware algorithm within the microcontroller 305 such that the signal from attenuator 307 does not saturate or overdrive the input to the amplification stages 308 and the final amplified signal maintains a constant output level free from the noise that would result from clipping of an overdriven input. This facilitates stable coverage of the desired wireless data network area, increases ease of use by not requiring system tuning when radios with differing TX output levels are used and ensures compliance with FCC limitations on power output from wireless network devices.

The amplified signal is coupled to a second RF switch 309 that, identically to the first RF switch 306, is digitally coupled to the microcontroller 305 and remains in transmit mode for so long as an RF signal exists on the input of the amplifier 205. While in transmit mode, the amplified signal is routed to one or more RF antennas 310 for transmission in the desired wireless network area.

If no signal is present at the input of the amplifier 205, the microcontroller 305 places both of the RF switches 306 and 309 in receive mode. While in receive mode, a signal present at the antenna 310 is coupled by the second RF switch 309 to a bandpass filter 311 that rejects frequencies outside the desired frequency range of incoming signals from devices using the wireless network. In a typical embodiment of the device the bandpass filter would pass signals in the 2.400 to 2.485 GHz range, the ISM band. Different bandpass filter specifications would be dictated if IEEE standards based on other frequencies are used.

The filtered signal form the bandpass filter 311 is coupled to a low-noise amplifier 312 which is further coupled to the first RF switch 306. While in receive mode, this switch 306 routes the received signal through the directional coupler 303 and thence to the bi-directional connection with the radio, access point, or other RF device where the signal will be demodulated and the data component extracted and coupled to one or more network devices using Ethernet cabling as is known in the art.

According to one embodiment of the invention, a series of light emitting diode (LED) indicators 313 are included on the amplifier 205. The LED indicators maybe used to indicate the condition of the amplifier. For instance, the LED indicators may indicate that the amplifier is in transmit mode, in receive mode, that an error condition exists, or provide other operational indicators.

It will be obvious to those of skill in the art that the invention described in this specification and depicted in the FIGURES may be modified to produce different embodiments of the present invention. Thus, the present invention has several advantages over the prior art without sacrificing any of the advantages of the prior art. Although embodiments of the invention have been illustrated and described, various modifications and changes may be made by those skilled in the art without departing from the spirit and scope of the invention.

The invention claimed is:

1. An apparatus comprising:
a bi-directional RF amplifier connected by a first coaxial cable to a transmit/receive antenna and connected by a second coaxial cable to a network access point, the amplifier having a data input port and a data output port, and the access point having a data input port;
a first data cable capable of carrying power, one end of such first data cable connected to the output port of the RF amplifier and the other end connected to the input port of the access point;
a second data cable capable of carrying power having one end connected to the input port of the amplifier and the other end connected to a power injector for providing power to the amplifier;
a third data cable for connecting the power injector to a data network; and
a power source for delivering power to the power injector;
wherein the amplifier further comprises:
a directional coupler connected to the second coaxial cable, and to a power detector that detects the presence of an RF signal, and to a first RF switch;
a microcontroller connected to the power detector that reads the presence of an RF transmit signal from the power detector and sends a control signal to the first RF switch and to a second RF switch, both RF switches being set to a transmit mode if an RF transmit signal is present and being set to a receive mode if an RF transmit signal is not present;
an attenuator connected to the first RF switch and to the microcontroller, and also to at least one fixed-gain RF amplifier stage, so that when the microcontroller sends a predetermined control signal to the attenuator, the attenuator sets the level of the RF transmit signal to not saturate the input of the fixed-gain RF amplifier stage to which it is connected;
the second RF switch being connected to the output of the fixed-gain RF amplifier stage to receive an amplified RF signal from the fixed gain RF amplifier stage and routing the signal over the first coaxial cable to the transmit/receive antenna for RF transmission when the microcontroller has set the first RF switch and the second RF switch to transmit mode;
a bandpass filter connected to a low noise amplifier and to the second RF switch so that when the microcontroller has set the first RF switch and the second RF switch to receive mode, the second RF switch routes any signal present on the antenna to the bandpass filter, the bandpass filter set to block any signal outside a predetermined radio frequency band and to pass the filtered signal to the low noise amplifier;
the low noise amplifier being further connected to the first RF switch to allow the first RF switch to route any amplified signal from the low noise amplifier through the directional coupler and from there to the second coaxial cable.

2. The amplifier of claim 1 wherein the bandpass filter blocks signals having a frequency outside the range of 2.400 to 2.485 GHz.

3. The amplifier of claim 1 further comprising at least one indicator to indicate at least one operating condition of the amplifier.

4. The amplifier of claim 1 wherein the power injector is a DC power injector.

5. The apparatus of claim 1 wherein the data cables are Ethernet cables.

6. The apparatus of claim 1 wherein the data cables are Universal Serial Bus cables.

7. The apparatus of claim 1 wherein the data cables are IEEE 1394 compliant cables.

8. An apparatus comprising:
an amplifier connected by a first cable to an antenna and connected by a second cable to a signal source, the amplifier having a data input port and a data output port, and the signal source having a data input port;
a first data cable capable of carrying power, one end of such first data cable connected to the output port of the amplifier and the other end connected to the input port of the signal source;
a second data cable capable of carrying power having one end connected to the input port of the amplifier and the other end connected to a power injector, and a third Ethernet cable for connecting the power injector to a data network.

9. The apparatus of claim 8 wherein the signal source is a network access point.

10. The apparatus of claim 8 further comprising a power source for delivering power to the power injector.

11. The apparatus of claim 8 wherein the amplifier comprises:
a directional coupler connected to the second cable, and to a power detector that detects the presence of a signal, and to a first switch;
a microcontroller connected to the power detector that reads the presence of a transmit signal from the power detector and sends a control signal to the first switch and to a second switch, both switches being set to a transmit mode if a transmit signal is present and being set to a receive mode if a transmit signal is not present;
an attenuator connected to the first switch and to the microcontroller, and also to at least one amplifier stage, so that when the microcontroller sends a predetermined control signal to the attenuator, the attenuator sets the level of the transmit signal to not saturate the input of the amplifier stage to which it is connected; and
the second switch being connected to the output of the amplifier stage to receive an amplified transmit signal from the amplifier stage and to route the amplified transmit signal over the first cable to the antenna for transmission when the microcontroller has set the first switch and the second switch to transmit mode.

12. The apparatus of claim 11 further comprising a bandpass filter connected to a low noise amplifier and to the second switch so that when the microcontroller has set the first switch and the second switch to receive mode, the second switch routes any signal present on the antenna to the bandpass filter, the bandpass filter being set to block any signal outside a predetermined frequency band and to pass the filtered signal to the low noise amplifier, the low noise amplifier being further connected to the first switch to allow the first switch to route any amplified signal from the low noise amplifier through the directional coupler and from there to the second cable.

13. The apparatus of claim 11 further comprising at least one indicator to indicate at least one operating condition of the amplifier.

14. The apparatus of claim 8 wherein the power injector is a DC power injector.

15. The apparatus of claim 8 wherein the data cables are Ethernet cables.

16. The apparatus of claim 8 wherein the data cables are Universal Serial Bus cables.

17. The apparatus of claim 8 wherein the data cables are IEEE 1394 compliant cables.

18. An amplifier comprising:
a directional coupler connected to a cable, and to a power detector that detects the presence of a signal, and to a first switch;
a microcontroller connected to the power detector that reads the presence of a transmit signal from the power detector and sends a control signal to the first switch and to a second switch, both switches being set to a transmit mode if a transmit signal is present and being set to a receive mode if a transmit signal is not present;
an attenuator connected to the first switch and to the microcontroller, and also to at least one amplifier stage, so that when the microcontroller sends a predetermined control signal to the attenuator, the attenuator sets the level of the transmit signal to not saturate the input of the amplifier stage to which it is connected; and
the second switch being connected to the output of the amplifier stage to receive an amplified transmit signal from the amplifier stage and to route the amplified transmit signal to the antenna for transmission when the microcontroller has set the first switch and the second switch to transmit mode.

19. The apparatus of claim 18 further comprising a bandpass filter connected to a low noise amplifier and to the second switch so that when the microcontroller has set the first switch and the second switch to receive mode, the second switch routes any signal present on the antenna to the bandpass filter, the bandpass filter being set to block any signal outside a predetermined frequency band and to pass the filtered signal to the low noise amplifier, the low noise amplifier being further connected to the first switch to allow the first switch to route any amplified signal from the low noise amplifier through the directional coupler and from there to the cable.

20. The apparatus of claim 18 further comprising at least one indicator to indicate at least one operating condition of the amplifier.

* * * * *